March 12, 1957
J. L. NEWPORT
2,784,440
INDUSTRIAL SWEEPING MACHINES
Filed May 26, 1955
2 Sheets-Sheet 1
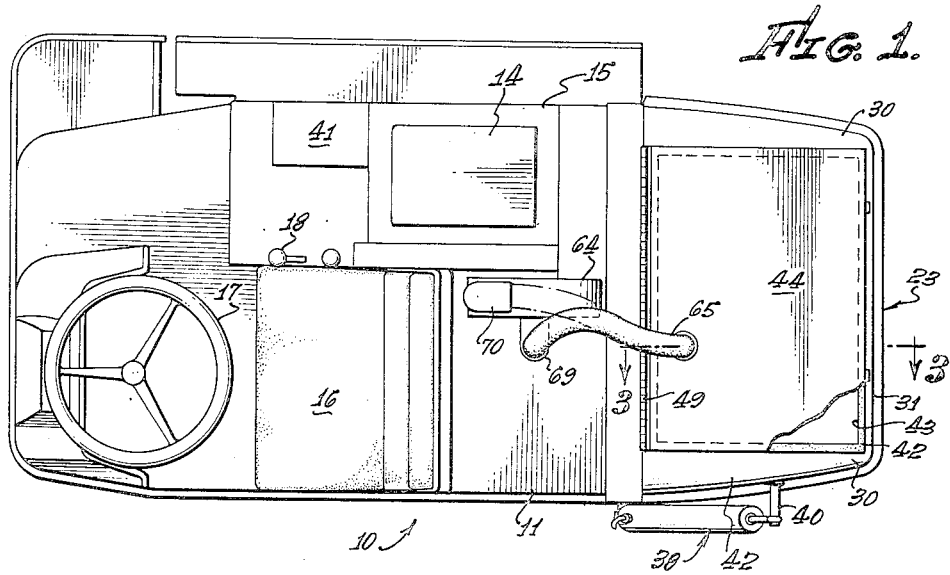
John L. Newport,
INVENTOR.
BY William P. Green
ATTORNEY.

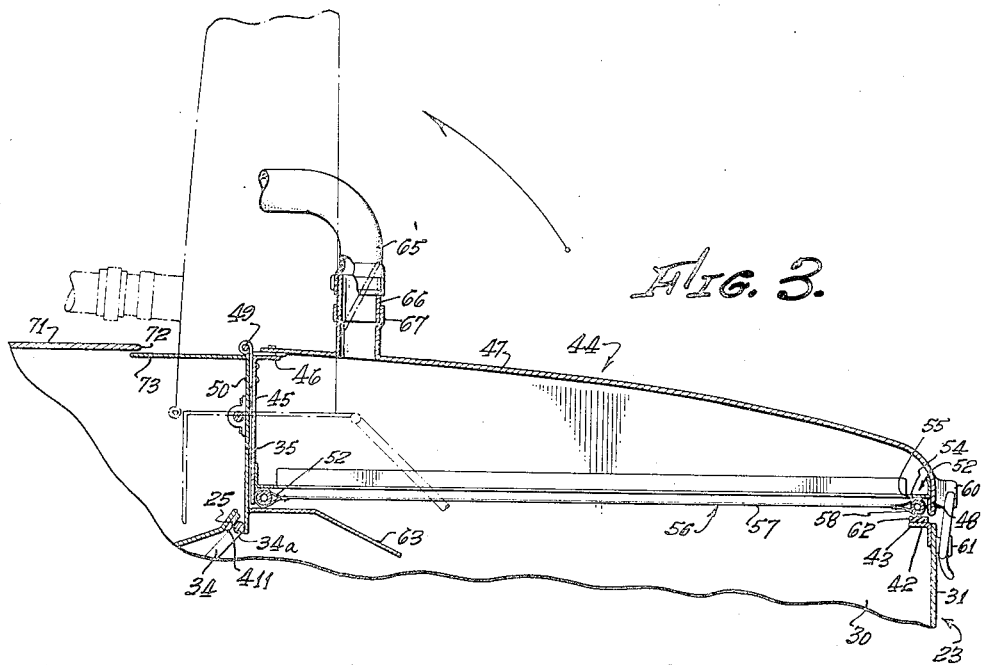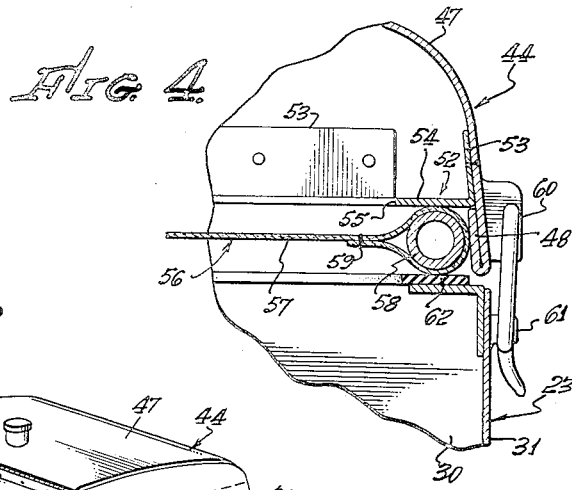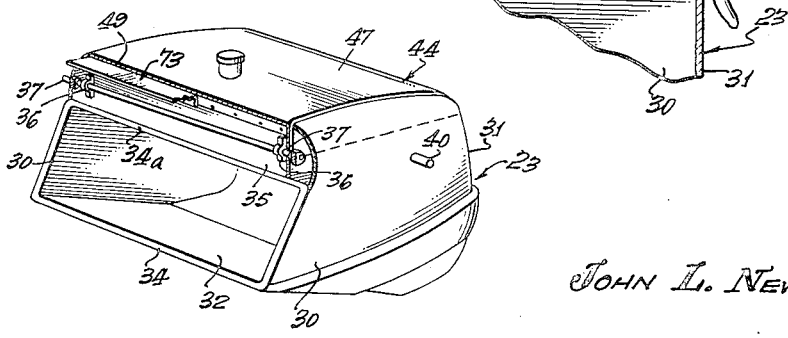

United States Patent Office 2,784,440
Patented Mar. 12, 1957

2,784,440
INDUSTRIAL SWEEPING MACHINES

John L. Newport, Pasadena, Calif., assignor to Wayne Manufacturing Company, Pomona, Calif., a corporation of California Application May 26, 1955, Serial No. 511,284

13 Claims. (Cl. 15—340)

This invention relates to improved mechanical sweeping machines, and particularly to industrial sweepers of a type usable for sweeping a floor or surface in an industrial plant or other relatively large area.

A sweeper embodying the invention includes a vehicle movable along the surface to be swept, and carrying a rotary power driven brush acting to sweep debris from that surface. The device includes also a collection chamber positioned to receive and collect the debris swept by the rotary brush, and from which the debris is ultimately removed, preferably by bodily swinging the chamber to a dumping position. Air is withdrawn from the chamber by a blower and through a filter element, which prevents the drawing of any dust or debris from the chamber with the air. Such withdrawal of air from the chamber is of considerable importance since the rotary brush tends to displace a considerable volume of air into the chamber by virtue of the sweeping action.

An important object of the invention is to provide an improved sweeper of the above discussed type, in which the collection chamber and filter are arranged to form a very compact unitary structure, which affords easy access to the interior of the chamber, and also allows easy removal of the filter element if desired. For this purpose, the chamber has a cover section at its upper side which is adapted to be opened to provide access to the interior of the chamber. The air filtering action is performed by a filter element which is contained in the collection chamber and divides the chamber into a lower debris receiving compartment and an upper chamber from which the blower takes suction. The filter element may be so mounted as to be removable when the cover is open.

Preferably, the filter element is carried by the cover, which may be hollow, with the filter disposed across the underside of the cover so that the upper air withdrawal compartment is formed in the hollow cover. Opening of the cover then automatically moves the filter to a position in which it does not interfere with access to the interior of the chamber. For most effective air withdrawal, the cover and filter element may both extend across substantially the entire horizontal extent of the collection chamber.

A further feature of the invention has to do with a unique arrangement providing for cleaning of the filter element without removing it from the device. In particular, I design the apparatus so that the upper air withdrawal chamber may be connected to the discharge side of the blower if desired, rather than to its suction side, to produce a downward flow of air through the filter element, acting to blow accumulated dust from the filter and back into the collection chamber.

The above and other features and objects of the present invention will be better understood from the following detailed description of the typical embodiment illustrated in the accompanying drawings in which:

Fig. 1 is a plan view of an industrial sweeper constructed in accordance with the invention;

Fig. 2 is a side view, partially broken away, of the Fig. 1 sweeper;

Fig. 3 is an enlarged fragmentary vertical section taken on line 3—3 of Fig. 1;

Fig. 4 is a further enlarged fragmentary view of an edge portion of the filter carrying tube for the debris collecting chamber; and Fig. 5 is a perspective view, partially broken away, of the collection chamber.

Referring first to Figs. 1 and 2, I have shown at 10 a mechanical sweeping machine adapted to be utilized for sweeping large floor areas in industrial plants or the like. This sweeper includes a body 11 which is movably supported on floor surface 12 by four wheels 13. The term "body," as designated by the number 11 in the drawings, is to be understood as including both the main framework of the vehicle, and the housing parts which are provided for enclosing the various working parts within the interior of the device. The vehicle is adapted to be power driven along surface 12 by means of a gasoline engine 14 mounted on a portion 15 of the body, and suitably connected in driving relation to the two rear wheels 13. The vehicle is operated by a driver situated on a seat 16, and having access to a steering wheel 17 and other control means typically represented at 18.

Body 11 contains a rotary brush 19 which is suitably mounted for rotation about a horizontal axis extending directly transversely of the vehicle, and which is rotatably driven by engine 14 in a clockwise direction as seen in Fig. 2. The rotary brush 19 may include a web structure having radially extending portions 20 to which the bristles 21 are mounted by channel shaped mounting elements 22. The bristles 21 may extend substantially entirely across the transverse extent of the vehicle.

As the brush 19 turns, it engages floor surface 12 and acts to sweep dust or debris upwardly from the floor surface and along the inside of an arcuate or partial cylindrical transverse wall 24 for delivery rearwardly into a collection chamber 23. At the upper side of the brush, wall 24 may terminate its arcuate curvature, and extend rearwardly at 24a to a location 25. At opposite sides of the brush 19, the brush chamber is defined by a pair of vertical parallel side walls 26, which define with a short bottom wall 27 an essentially tubular passageway through which the debris passes rearwardly into collection chamber 23. The short lower wall 27 of this passage may comprise an upper portion of an arcuate or partial cylindrical wall 28, along which bristles 21 move as they advance downwardly toward the sweeping location. A rubber deflector flap 29 may extend downwardly at the forward side of brush 19, to close off the forward side of the sweeping area.

The collection chamber 23 includes a pair of side walls 30, a rear wall 31, and a bottom wall 32 having a portion 32a which extends angularly upwardly and forwardly toward the location of short debris directing wall 27 carried by the body of the vehicle. As best seen in Figs. 2 and 5, the side walls 30 extend forwardly to a pair of parallel inclined edges 33, which define the opposite sides of an inclined rectangular opening which registers with the debris directing passage in the body to direct the debris into the collection chamber. Preferably, this inclined forward opening or mouth of the collection chamber 23 is defined by a rigid rod 34, which is deformed to the illustrated rectangular configuration, and is continuously welded to edges 33 of side wall 30, and to the rear edge of the inclined portion 32a of bottom wall 32. The upper horizontal portion 34a of rod 34 is continuously welded to the lower edge of an upwardly extending vertical wall 35 which is rigidly attached to the other walls of the collection chamber.

The entire collection chamber 23 is mounted for bodily swinging movement rearwardly and upwardly through about 90°, so that the debris receiving opening defined by rod 34 may face downwardly for dumping the contents of chamber 23 onto surface 12 when desired. The collection chamber may be mounted for such swinging movement by hinge elements 36 attached to the rear side of vertical wall 35, and pivotally disposed about hinge pin 37 carried by the opposite side walls of the vehicle body 11. The collection chamber is swung from its Fig. 2 active position to its dumping position by means of a piston and cylinder mechanism 38, the cylinder of which is pivotally attached at 39 to one side of the vehicle body, and the piston of which is pivotally attached at 40 to one of the side walls 30 of the collection chamber. As will be apparent, when the operator actuates a motor driven control pump, represented at 41, to supply pressure fluid to piston and cylinder mechanism 38, the piston of this mechanism acts against the collection chamber at 40 to swing the chamber rearwardly and upwardly about hinges 36, 37, to dump the contents of the collection chamber downwardly along wall 32a and out of the opening defined by rod 34 onto floor surface 12. In the Fig. 2 active position of collection chamber 23, rod 34 engages a rectangular rubber seal element 411 continuously along the rectangular length of that element and the rod, to form an effective dust tight seal between rod 34 and the dust directing walls 24, 26 and 27 carried by the vehicle body.

At its upper side, the collection chamber 23 has a top horizontal wall 42, which contains a rectangular opening 43 extending across almost the entire horizontal area of the collection chamber, and which is closed at its upper side by a hollow sheet metal cover 44. Cover 44 has a forward vertical wall 45 extending along vertical wall 35 attached to the collection chamber, and welded at 46 to the top wall 47 of the cover. The top wall 47 curves downwardly at its rear edge and its opposite side edges, and may be turned back at each of those edges as shown at 48 in Figs. 3 and 4. The cover is mounted by a piano type hinge 49 to the uppermost part of vertical wall 35, for upward swinging movement about a horizontal axis. As will be apparent, one of the elements of hinge 49 is welded at 50 to vertical wall 35, while the other hinge element is suitably secured to the cover, as by the same welding 46 utilized for securing together the two cover elements 45 and 47. At opposite sides of the cover, the vertical forward wall 45 of the cover may be rigidly secured to the essentially vertical side walls of the cover element 47.

Near the lower edges of the various vertically extending walls defining the periphery of covering 44, the cover contains a rectangular metal frame structure 52, whose vertical portions 53 are suitably welded to the vertical sides of the cover, and which has a horizontal rectangular portion 54 defining a rectangular opening 55 through which air is drawn upwardly into the hollow cover. This air being drawn upwardly into the cover passes through filter element 56, which extends across the underside of hollow cover 44, and which may comprise a sheet of filtering cloth 57 (typically 10 oz. canton flannel) whose peripheral portion extends about an essentially rigid rectangular frame member 58. As best seen in Fig. 4, the filter material 57, after passing about frame member 58, is stitched to itself along a rectangular line 59, to permanently secure the filter cloth to the frame.

The rectangular filter element formed by cloth 57 and frame 58 is of a size to fit upwardly into the underside of the cover and against backing plate 54, and is a sufficiently tight fit within the recess defined by the engaged vertical walls of the cover to frictionally hold the filter unit in the illustrated position within the cover, while at the same time permitting manual removal from the cover when desired. Thus, even when cover 44 is swung upwardly relative to the rest of the collection chamber 23, filter unit 56 remains in the cover, so that an operator then has access to the interior of chamber 23, typically for filling manually swept dust or debris into the chamber. The cover is releasably retained in closed condition by suitable latches 60 carried by the cover at its rear side and engageable with coacting latch elements 61 on the collection chamber. When the cover is closed, the rectangular peripheral portion of the filter unit 56 engages downwardly against a rectangular rubber sealing element 62 carried by top wall 42 of the collection chamber about its opening 43, to thus form a dust tight seal between the cover and the rest of the collection chamber. Along the forward edge of opening 43, top wall 42 of the collection chamber may have an angularly downturned portion 63 for deflecting the debris from brush 19 downwardly away from filter unit 56.

During operation of the apparatus, air is withdrawn from the compartment within cover 44 by means of a motor driven blower 64, which may typically be mounted to the upper side of wall 24. This blower 64 takes suction from the cover through a flexible tube or hose 65, which has an element 66 at one of its ends removably receivable within a tubular fitting 67 projecting upwardly from the top wall 47 of cover 44. At its opposite end, tube 65 has a similar rigid tubular element 68 which is removably receivable within a tubular suction fitting 69 on blower 64. Normally, the air from blower 64 discharges to atmosphere through a tubular discharge fitting 70 dimensioned the same as suction fitting 69. When it is desired to clean filter element 56, the end element 68 of tube 65 is removed from suction fitting 69, and connected into discharge fitting 70, so that the blower discharges into the hollow cover 44, and blows air downwardly through filter cloth 57 to cause any accumulated dust to fall off of the underside of that cloth and fall downwardly into chamber 23 with the rest of the debris.

When collection chamber 23 is swung rearwardly and upwardly to a dumping position by piston and cylinder mechanism 38, cover 44 is in a closed position. In order to allow for the swinging movement of cover 44 with chamber 23, the top wall 71 of the vehicle body may be cut away at 72 just forwardly of hinge 49, to allow sufficient room for the hinge 49 and fitting 67 and tube 65 to swing forwardly. In the active sweeping position of chamber 23 and cover 44, the open space 72 forwardly of hinge 49 may be closed by a forwardly extending portion 73 of the previously discussed vertical plate 35 of the collection chamber structure.

To now describe the operation of the illustrated apparatus, assume that chamber 23 and cover 44 are in the positions of Fig. 2, and that flexible tube 65 is connected to the suction side 69 of blower 64. If the engine 14 is then placed in operation, to drive brush 19 and the other motor driven portions of the apparatus, and if the operator sitting on seat 16 then causes the vehicle to move along surface 12, brush 19 will become effective to sweep dust or debris upwardly from surface 12 and along wall 24, to pass through the front opening of collection chamber 23 (the opening defined by rectangular rod 34) into the chamber. The debris thus accumulates within the bottom of chamber 23, while blower 64 acts to withdraw air from the chamber through filter element 57 into the interior of the upper hollow cover 44, and then through flexible tube 65 for discharge by the blower to the atmosphere at 70. As will be apparent, the rotary motion of brush 19 within the brush compartment will serve to displace a substantial amount of air into chamber 23, this air being withdrawn by blower 64. If the operator desires access to the interior of chamber 23, as for instance to fill manually swept debris into the chamber, latches 60 are released to open cover 44 (carrying filter unit 56) to allow the desired access to the collection chamber. If the filter element 56 becomes clogged, it may be easily cleaned merely by connecting end 68 of tube 65 into blower outlet fitting 70 rather than suction fitting 69, so that the blower forces air into the hollow cover, to pass downwardly through the filter cloth 57, and thus blow the accumulated dust or other material downwardly from the undersurface of sheet 57 and back into the collection chamber. When the collection chamber becomes filled, the operator acutates control 41 to feed hydraulic fluid to piston and cylinder mechanism 38, to swing collection chamber 23 rearwardly and upwardly about hinge structure 36, 37 (see Fig. 3), to thus dump the collected debris from chamber 23 onto surface 12 or any suitable receptacle provided on that surface. If it ultimately becomes necessary to replace filter element 57, that element may be very easily withdrawn from its position of frictional retention within cover 44, so that a replacement may be inserted into the cover.

I claim:

1. An industrial sweeper comprising a wheeled motor vehicle including a vehicle body, a power driven rotary brush carried by the vehicle body and operable to sweep debris from a surface along which the vehicle body is advanced, means forming a collection chamber carried by the vehicle body at a location to receive and collect the debris swept from said surface by the brush, said chamber including a main debris receiving section and an upper cover section openable to provide access to the interior of the chamber, a filter element in the chamber dividing said chamber into an upper compartment and a lower compartment, said main section of the chamber having an opening at its forward side through which said brush displaces debris into said lower compartment, the upper compartment being at least partially in said cover section, a blower carried by the vehicle body having its intake connected to and taking suction from said upper compartment and drawing air from the lower compartment through the filter into the upper compartment, and means mounting said collection chamber, including said main section, cover section and filter element, for bodily swinging movement as a unit relative to the vehicle body between a first position for receiving debris from the brush through said opening and a second position in which the chamber is tilted in a manner to dump the debris therefrom through said opening.

2. An industrial sweeper as recited in claim 1, in which said cover section has a lower portion forming a recess shaped substantially in correspondence with said filter element and which receives and retains said filter element.

3. An industrial sweeper comprising a wheeled motor vehicle body, a power driven rotary brush carried by the vehicle body and operable to sweep debris from a surface along which the vehicle body is advanced, means forming a collection chamber carried by the vehicle body at a location to receive and collect the debris swept from said surface by the brush, a hollow cover extending across substantially the entire upper side of said collection chamber and openable to provide access to the interior of said chamber, a filter element carried by said cover at the lower portion thereof and extending across the major portion of the horizontal extent of the cover to separate the interior of the cover from the debris receiving chamber, said collection chamber having an opening at its forward side beneath the level of said cover and through which said brush displaces debris into the chamber, a blower carried by the vehicle body having its intake connected to and taking suction from the interior of said cover above said filter element, said filter element being removable from said cover when the cover is open, and means mounting said collection chamber, cover, and filter element for bodily swinging movement as a unit rearwardly and upwardly relative to the vehicle body between a first position for receiving debris from the brush through said opening and a second position in which the chamber is tilted in a manner to dump the debris therefrom through said opening.

4. An industrial sweeper as recited in claim 3, including a power operated unit for swinging said chamber between said two positions, means mounting said cover for upward swinging movement relative to the chamber to an open position, said filter element being a sheet of filter material carried by a frame and removable from the underside of the cover when the latter is open.

5. An industrial sweeper as recited in claim 1, in which said filter element is removable from the chamber when said cover section is open.

6. An industrial sweeper as recited in claim 1, in which said filter element is carried by said cover section for movement therewith relative to said main section of the chamber.

7. An industrial sweeper as recited in claim 1, in which said cover section is hollow and carries said filter element across the underside thereof for opening movement with the cover.

8. An industrial sweeper as recited in claim 1, in which the connection between the blower and upper compartment includes means for selectively connecting said upper compartment to either the suction or discharge side of said blower.

9. An industrial sweeper as recited in claim 1, including means mounting said cover section of the chamber for swinging movement between open and closed positions relative to said main section.

10. An industrial sweeper as recited in claim 1, including power operated means for actuating said chamber between said positions.

11. An industrial sweeper as recited in claim 3, including means mounting said cover for upward swinging movement relative to the chamber to an open position, and means for bodily swinging said chamber relative to the vehicle body to a position for dumping the debris from the chamber, the connection between said blower and cover including a flexible tube operable to selectively connect the interior of the cover to either the suction or discharge side of said blower.

12. An industrial sweeper as recited in claim 3, in which said filter element includes a sheet of filter material extending across the underside of said cover, and a frame extending along the periphery of said sheet and carrying it, said cover being adapted to removably receive and retain the filter element.

13. An industrial sweeper as recited in claim 12, in which said cover has a lower portion forming a recess shaped substantially in correspondence with said frame and which receives and retains said filter element.

References Cited in the file of this patent

UNITED STATES PATENTS

| | | |
|---|---|---|
| 1,560,612 | Sims | Nov. 10, 1925 |
| 2,247,472 | Bible | July 1, 1941 |
| 2,405,129 | Bible | Aug. 6, 1946 |
| 2,533,268 | Lanter | Dec. 12, 1950 |
| 2,678,462 | Lison et al. | May 18, 1954 |